US012653343B2

(12) United States Patent
Claesson et al.

(10) Patent No.: US 12,653,343 B2
(45) Date of Patent: Jun. 16, 2026

(54) CONVECTION DEEP FAT FRYER

(71) Applicant: FRYMASTER, LLC, Shreveport, LA (US)

(72) Inventors: Jan Claesson, Land O' Lakes, FL (US); Daryl G. Erbs, Tarpon Springs, FL (US); Douglas S. Jones, New Port Richey, FL (US)

(73) Assignee: FRYMASTER, LLC, New Port Richey, FL (US)

( * ) Notice: Subject to any disclaimer, the term of this patent is extended or adjusted under 35 U.S.C. 154(b) by 1200 days.

(21) Appl. No.: 17/235,440

(22) Filed: Apr. 20, 2021

(65) Prior Publication Data

US 2022/0330753 A1 Oct. 20, 2022

(51) Int. Cl.
*A47J 37/12* (2006.01)

(52) U.S. Cl.
CPC .................................. *A47J 37/1233* (2013.01)

(58) Field of Classification Search
CPC .... A47J 37/12; A47J 37/1233; A47J 37/1238; A47J 37/1257
USPC .......................................................... 99/403
See application file for complete search history.

(56) References Cited

U.S. PATENT DOCUMENTS

| | | | |
|---|---|---|---|
| 2,243,661 A | 5/1941 | Tota | |
| 3,356,218 A * | 12/1967 | Grudoski | ............... B01D 33/11 |
| | | | 210/DIG. 8 |
| 4,049,364 A | 9/1977 | Ross | |
| 4,599,990 A | 7/1986 | Fritzsche et al. | |
| 4,772,183 A * | 9/1988 | Durden | ................ F16J 15/4476 |
| | | | 415/112 |
| 5,680,811 A * | 10/1997 | Highnote | ............ A47J 37/1233 |
| | | | 210/DIG. 8 |
| 8,646,382 B2 | 2/2014 | Highnote | |
| 9,629,502 B2 | 4/2017 | Highnote | |
| 2004/0096326 A1 | 5/2004 | Chang et al. | |
| 2006/0076281 A1 | 4/2006 | Aldeguer | |
| 2007/0137497 A1* | 6/2007 | Savage | ............... A47J 37/1223 |
| | | | 99/403 |

(Continued)

FOREIGN PATENT DOCUMENTS

| | | | | |
|---|---|---|---|---|
| DE | 4142465 A1 * | 6/1993 | ......... | A47J 37/1209 |
| KR | 20180017510 A * | 2/2018 | | |
| WO | 2007-055980 A2 | 5/2007 | | |

OTHER PUBLICATIONS

International Search Report dated Aug. 15, 2022 for PCT Appl. No. PCT/US2022/024538.

(Continued)

*Primary Examiner* — Steven W Crabb
*Assistant Examiner* — Alba T Rosario-Aponte
(74) *Attorney, Agent, or Firm* — Ohlandt, Greeley and Perle, L.L.P.

(57) ABSTRACT

A deep fat fryer with a vat containing cooking oil for frying food including an integrated circulating pump housing below the oil level connected to a separate heat exchanger wherein the cooking oil is circulated from the cooking vat through the heat exchanger then back into the cooking vat. Circulating pump motor, pump inlet, and pump impeller assembly is mounted with the pump motor above the cooking oil level and the pump assembly is removable from the cooking vat and pump housing without the need to remove the oil from the cooking vat.

11 Claims, 8 Drawing Sheets

(56)     References Cited

U.S. PATENT DOCUMENTS

2010/0282095 A1 *  11/2010  Highnote ............ A47J 37/1276
                                                        99/403
2015/0157175 A1    6/2015  Highnote

OTHER PUBLICATIONS

Written Opinion dated Aug. 15, 2022 for PCT Appl. No. PCT/US2022/024538.
Extended European Search Report dated Mar. 26, 2025 for European Application No. 22792223.4.

* cited by examiner

CONVECTION DEEP FAT FRYER

BACKGROUND OF THE DISCLOSURE

1. Field of the Disclosure

The present disclosure is directed to deep fat fryers. More particularly, the present disclosure relates to convection type deep fat fryers where the cooking oil is heated by pumping it through a heat exchanger that is external to the vat of oil used for cooking.

More particularly, the present disclosure relates to a convection type deep fat fryer where the cooking oil is pumped out of the cooking vat into a separate heat exchanger then back into the cooking vat in a continuous loop.

2. Description of the Related Art

Convection fryers include one or more vats that hold cooking oil that is continuously circulated to a heat exchanger that is external to the vat to be heated and returned to the vat so that food submerged in the cooking oil in the vat can be cooked. Convection fryers are desirable over standard, static type deep fat fryers for many reasons. Convection fryers can apply a much higher heat flux in a smaller footprint than is possible with a fryer that heats the oil using only the surfaces of the fry vat in contact with the cooking oil. This allows the convection fryers to have a smaller footprint for a given cooking capacity. The higher heating power and the movement of the oil through the food being cooked enables the convection fryer to cook larger loads with less temperature drop at the beginning of a cooking cycle and recover quicker (and/or follow a cooking temperature profile) than a standard fryer with less heating power. The high heating power also allows a faster cold start from a setback temperature, or idle temperature, to a cooking temperature, making it more likely the operator will setback the oil temperature saving energy and increasing oil life. A user operates a fryer in a setback temperature, for example, to keep oil heated at a lower temperature during slow periods when the time between cooks is long, when certain types of oil are used that would solidify if not heated to the lower temperature, or to maintain a temperature of the fryer so that when a cook commences the fryer can quickly reach the required cooking temperature.

Many attempts have been made to design a reliable and efficient convection frying cooking system. These prior designs have had problems with various parts of the fryer resulting in low reliability, and other drawbacks.

In particular, there have been many attempts to circulate heated cooking oil through a heat exchanger external to the fryer vat using an in-line pump. Problems have arisen with most of these designs due to pump/motor shaft seals leaking oil leading to low reliability and high maintenance costs. These systems usually have a pump head and motor mounted below the cooking area of the fryer vat. In these systems seals between the pump motor and pump wear and begin to leak cooking oil requiring replacement of the seals on a regular basis.

Others have tried using pumps with magnetic drives (U.S. Pat. Nos. 8,646,382, 9,629,502) that do not have any seals between the motor and the pump. These systems did not leak but had other problems with the pump system when cooking foods with breading or small crumbs. These small crumbs suspend in the oil, carbonize over time and become abrasive.

These carbonized particles abrade pump components and eventually cause the pump impeller to jam and not circulate the oil.

Accordingly, it has been determined by the present disclosure that there is a continuing need for a convection fryer that overcomes, alleviates, and/or mitigates one or more of the aforementioned and other deleterious effects of prior devices.

SUMMARY OF THE DISCLOSURE

The present disclosure solves the issues of past attempts to circulate heated cooking oil through a heat exchanger external to the fryer vat by use of a pump by eliminating shaft seals that can wear and leak. This is accomplished using a pedestal-type centrifugal pump with the motor located above the oil level. This type of pump does not need seals due to the motor location. The impeller housing and impeller are submerged in the cooking oil with the motor shaft extending up from the impeller and the oil level to where the pump is located. To minimize the pump motor bearing temperatures during operation, the shaft, for example, is made from low-conductivity metal and a heat dissipating component is located near the top of the shaft, underneath the pump motor to cool the shaft and motor.

To simplify pump installation during manufacture and pump servicing in the field, the vat has an integrated mounting surface for the pump motor, pump upper impeller housing and pump impeller assembly. This integrated mounting surface allows the lower impeller housing to be mounted and sealed to the exterior bottom surface of the vat. The interface surface opening allows for the pump motor, pump impeller, and upper impeller housing to be mounted vertically through the interface surface and into the pump housing from above, which allows the pump assembly to be easily installed or removed without having to remove the oil from the frying system.

The above and other objects, features, and advantages of the present disclosure will be apparent and understood by those skilled in the art from the following detailed description, drawings, and accompanying claims. As shown throughout the drawings, like reference numerals designate like or corresponding parts.

DETAILED DESCRIPTION OF THE DISCLOSURE

Figure 1:
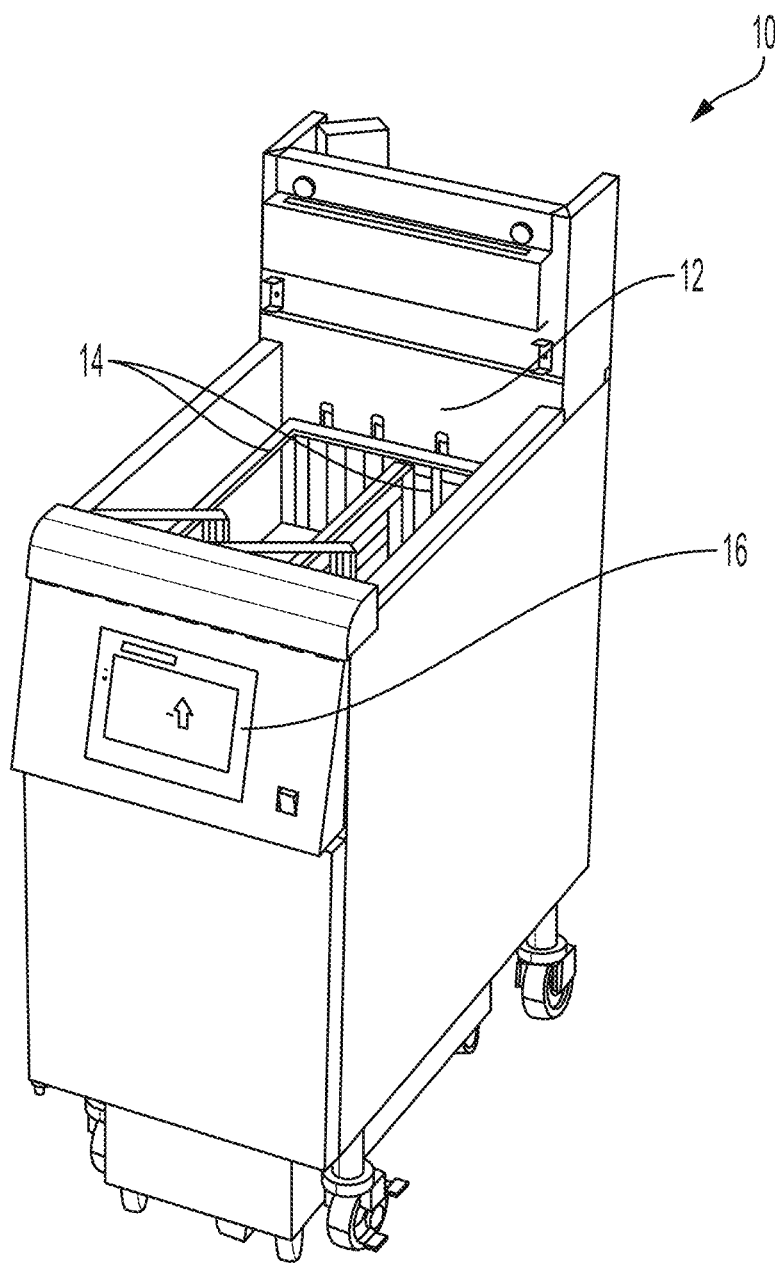
FIG. 1 is a front perspective view of a single vat convection deep fat fryer according to the present disclosure.

A convection type deep fat fryer generally represented by reference numeral 10 of the present disclosure is shown in FIG. 1 ("fryer 10"). Fryer 10 is a single vat fryer having a single fry pot or vat 12. Fryer 10 is shown with two fryer baskets 14 for holding food and has a touchscreen control interface 16.

Figure 2:
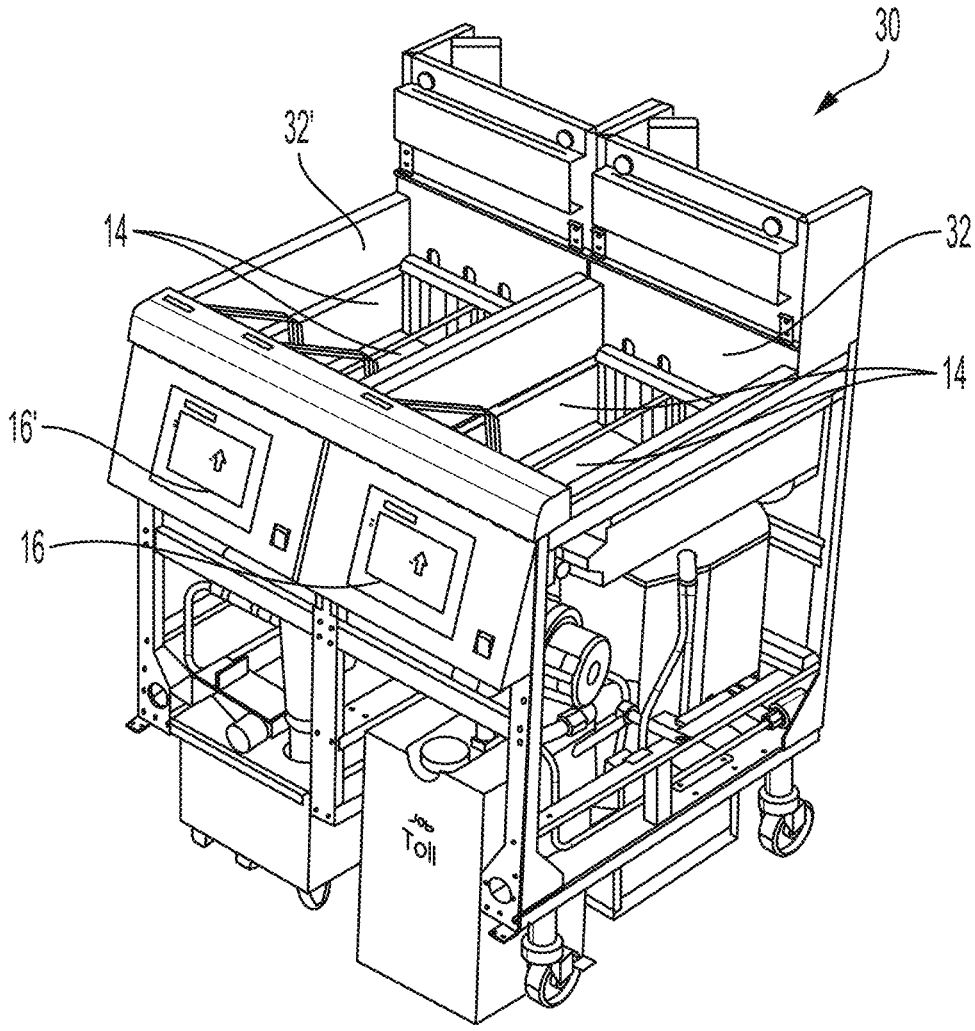
FIG. 2 is a front perspective view of a two-vat convection deep fat fryer with side and front panels removed according to the present disclosure.

A two-vat version of a convection fryer 30 is shown in FIG. 2. Fryer 30 has two oil vats 32 and 32' rather than just one and is shown holding four fryer baskets 14. Fryer 30 is equipped with two touchscreen control interfaces 16 and 16', one for each fry pot. Fryer 30 operates the same as fryer 10 except with two vats 32 and 32'. Accordingly, fryer 10 and 30 can each be modified to have additional vats that are the same as vats 12, 32 and 32'. Each fry vat has its own independent oil heating system that each includes a heat exchanger 82 as discussed herein.

Figure 3A:
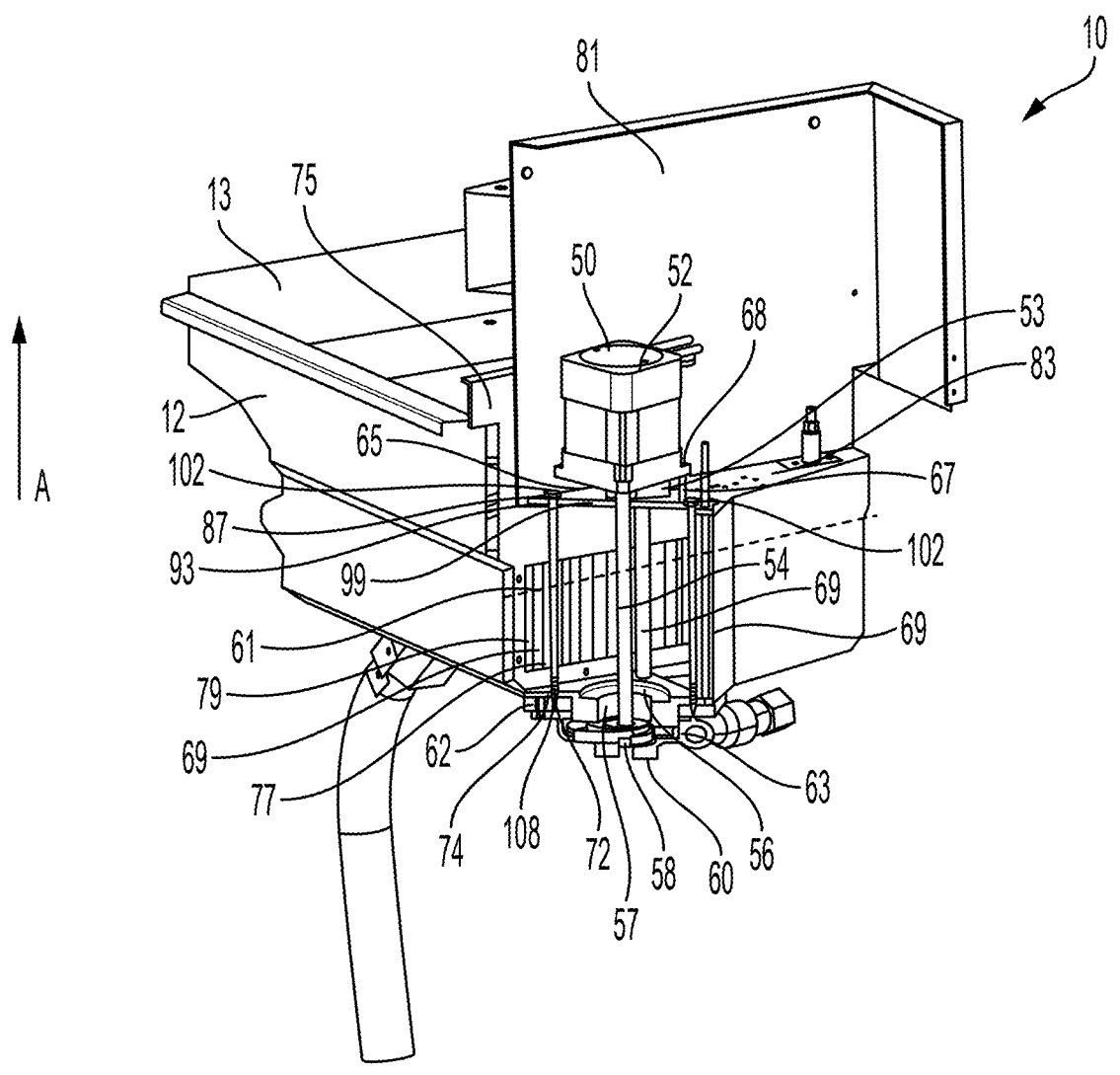
FIG. 3*a* is a rear perspective partial view having parts removed of a pumping portion of the single vat fryer of FIG. 1.
Figure 3B:
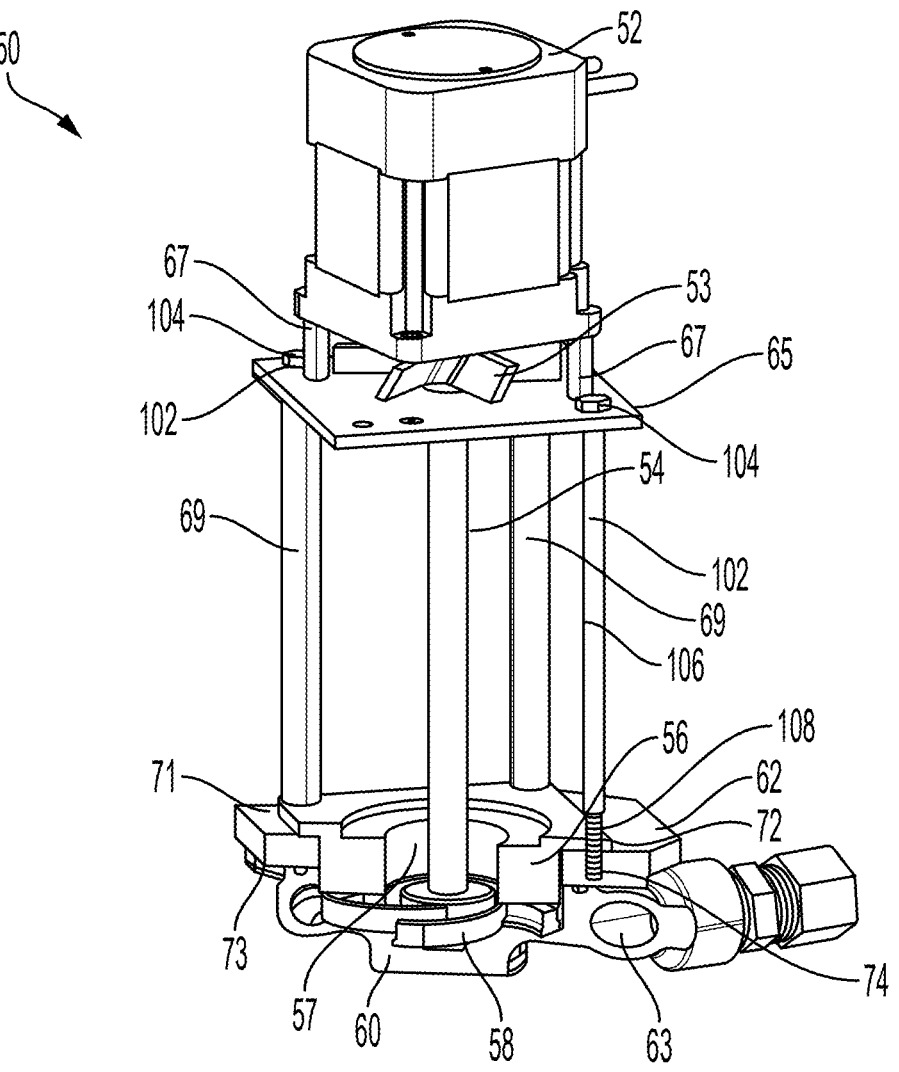
FIG. 3*b* is a perspective view and partial cut away of an oil pump assembly connected to a lower impeller housing of the pumping portion shown in FIG. 3*a*.
Figure 6:
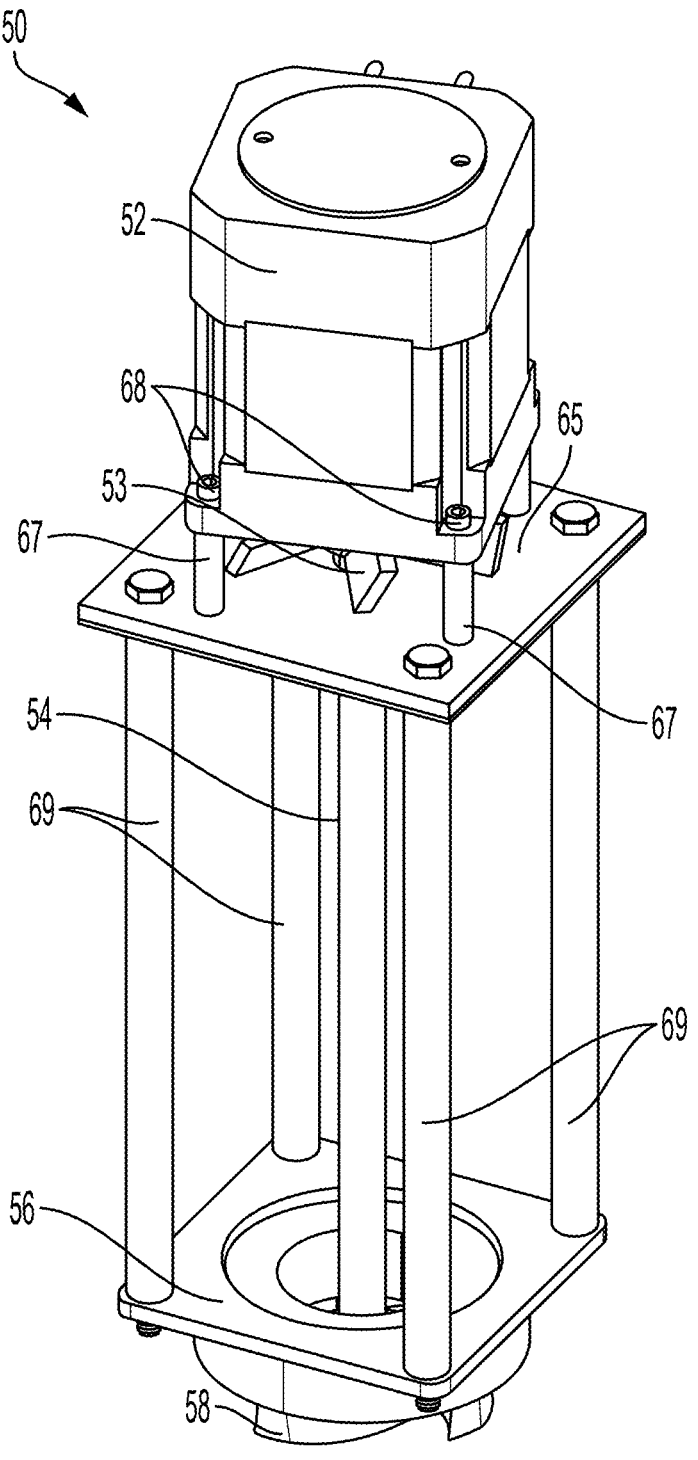
FIG. 6. is a side perspective view of the oil pump assembly of FIG. 3*b*.
Figures 7, 8:
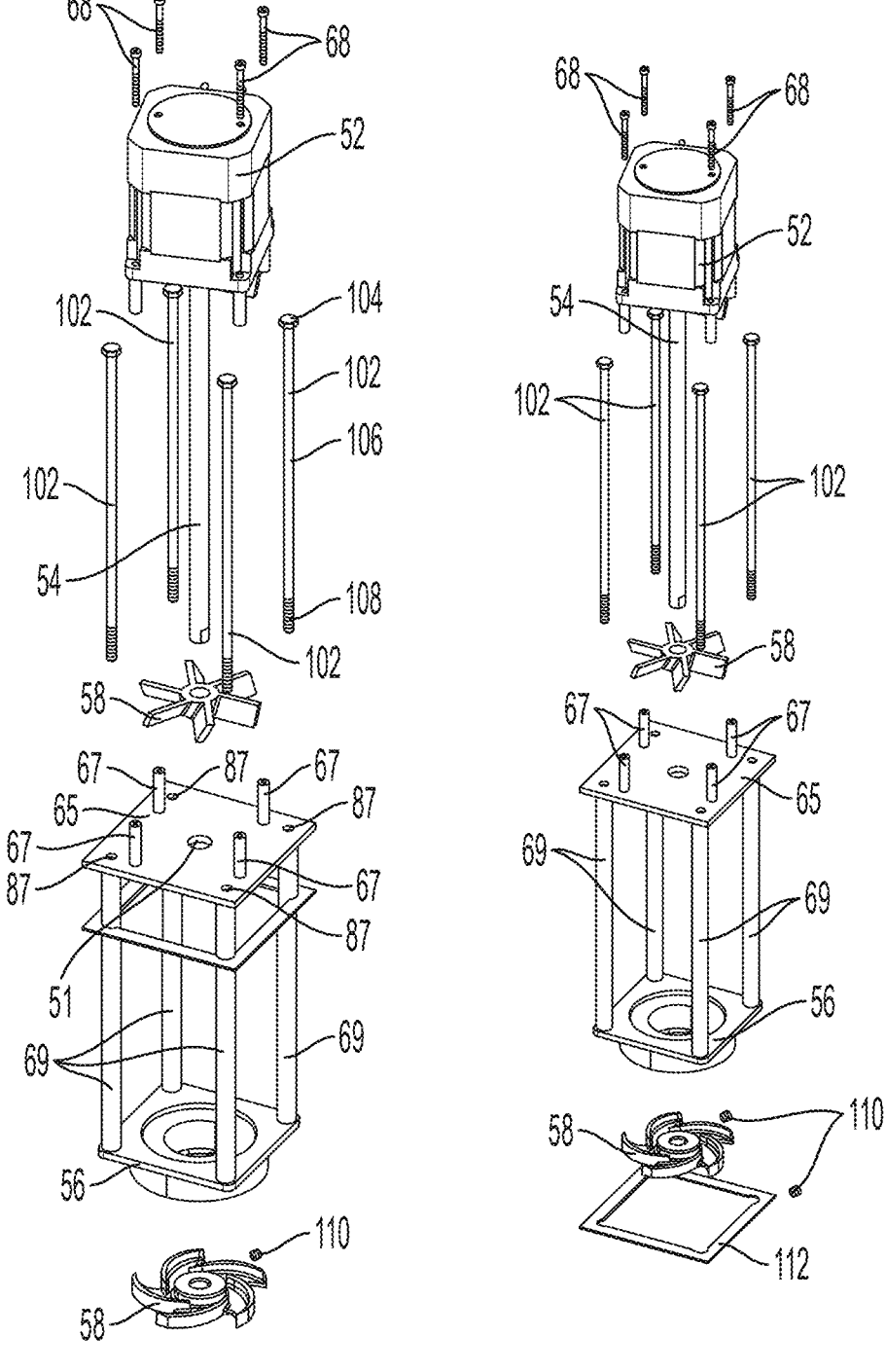
FIG. 7 is an exploded side perspective view of the oil pump assembly of FIG. 6 connected to a square piece.
FIG. 8 is an exploded side perspective view of the oil pump assembly of FIG. 6 with the square piece removed.

FIG. 3a is a partial view of a rear of fryer 10 showing a portion of vat 12 where an oil pump assembly 50 sits. FIG. 3b is a close up of pump assembly 50 and partial cut-away. Referring to FIGS. 6-8, oil pump assembly 50 has a pump motor 52, a heat dissipating component 53, a pump shaft 54, an upper impeller housing 56, and an impeller 58. Pump motor 52 is connected to pump shaft 54 so that pump motor 52 can rotate pump shaft 54. Pump shaft 54 is connected to heat dissipating component 53 so that heat dissipating component 53 rotates with pump shaft 54. Pump shaft 54 is connected to impeller 58 so that impeller rotates with pump shaft 54. Pump motor 52 is supported by members 67 that extend from a support platform 65 so that heat dissipating component 53 is between pump motor 52 and support platform 65. Fasteners 68, for example, screws, connect pump motor 52 to support platform 65. Each of fasteners 68 pass through pump motor 52 and into one of members 67 connecting pump motor 52 to support platform 65, for example, by nuts that mate with fasteners 68 that are screws or each of fasteners 68 that are screws mates with threads in one of members 67. Support platform 65 is connected to upper impeller housing 56 by spacer tubes 69 to connect pump motor 52 to upper impeller housing 56. Fasteners 102 are insertable through openings 87 in support platform 65, through spacer tubes 69 and through openings 72 in upper impeller housing 56 that are shown in FIG. 3B. Referring to FIG. 7, each of fasteners 102 has a head 104, body portion 106 and threaded portion 108. One of seals 110 are positioned around each fastener 102 between upper impeller housing 56 and a mounting surface 62 that is shown in FIG. 3b. A square support 112 is removably placed around spacer tubes 69. Pump shaft 54 that extends from pump motor 52 passes through a hole 51 in support platform 65 and through a hole 57 in upper impeller housing 56 to position impeller 58 below upper impeller housing 56.

Referring back to FIG. 3b, pump mounting surface 62 is shown. Pump mounting surface 62 is integrally attached, for example, welded into a bottom of oil vat 12 such that the upper face 71 of mounting surface 62 is inside oil vat 12, and a lower face 73 of pump mounting surface 62 is on the exterior of vat 12. Upper impeller housing 56 is removably connected to upper face 71 of pump mounting surface 62. Fasteners 102 each have threaded portions 108 that can mate with threaded openings 74 in pump mounting surface 62 to connect upper impeller housing 56 to mounting surface 62. Lower impeller housing 60 is hermetically attached to lower face 73 of pump mounting surface 62. This design allows the oil vat 12 to be completely sealed while still allowing pump assembly 50 to be removed from the fryer 10 without having to drain the oil.

Referring back to FIG. 3a, vat 12 has an intermediate wall 75 that extends from vat opening 13 across an entire cross-section of vat 12. Intermediate wall 75 has an opening 77 that can be covered by a filter 79. Intermediate wall 75 is connected to an upper wall 81. Extending from intermediate wall 75 is a support wall 83. Support wall 83 has an aperture 99 that is large enough to allow spacer tubes 69, upper impeller housing 56 and impeller 58 to pass through aperture 99 when connecting and disconnecting oil pump assembly 50.

When oil pump assembly 50 is connected to fryer 10, impeller 58 is between upper impeller housing 56 and lower impeller housing 60 with upper impeller housing 56 and lower impeller housing 60 being connected to pump mounting surface 62 on opposite sides. Pump shaft 54 extends upward through hole 57 in upper impeller housing 56 to pump motor 52. Pump motor 52 is connected to support platform 65 by fasteners 68 that pass through pump motor 52 and members 67. Support platform 65 is sized to be larger than aperture 99 of support wall 83 so that an outer portion 93 of support platform 65 that is outside of aperture 99 rests on support wall 83 on a side of support wall 83 that faces pump motor 52. Spacer tubes 69 extend from support platform 65 through aperture 99 of support wall 83 to upper impeller housing 56. Fasteners 102 are through openings 87 in support platform 65, spacer tubes 69, and openings 72 of upper impeller housing 56 with threaded portions 108 of fasteners 102 that are screwed into threaded openings 74 in pump mounting surface 62 securing oil pump assembly 50 to fryer 10.

To disconnect oil pump assembly 50 having pump motor 52, heat dissipating component 53, pump shaft 54, upper impeller housing 56, and impeller 58, as shown in FIG. 6, from fryer 10, threaded portions 108 of fasteners 102 are unscrewed from threaded openings 74 in pump mounting surface 62 to allow fasteners 102 to be removed from openings 72 of upper impeller housing 56, spacer tubes 69 and openings 87 in support platform 65. Once fasteners 102 are removed, then pump motor 52 is moved in a direction A moving pump shaft 54, spacer tubes 69, upper impeller housing 56, and impeller 58 away from lower impeller housing 60 and through aperture 99 of support wall 83 removing oil pump assembly 50 from fryer 10. Lower impeller housing 60 stays hermetically attached to lower face 73 of pump mounting surface 62 when oil pump assembly 50 is removed from fryer 10. This design allows the oil vat 12 to be completely sealed while still allowing pump assembly 50 to be removed from the fryer 10 without having to drain the oil.

To connect oil pump assembly 50 having pump motor 52, heat dissipating component 53, pump shaft 54, upper impeller housing 56, and impeller 58, to fryer 10, pump shaft 54, spacer tubes 69, upper impeller housing 56, and impeller 58 are inserted in a direction opposite direction A through aperture 99 of support wall 83. Fasteners 102 are then inserted through openings 87 in support platform 65, spacer tubes 69, and openings 72 of upper impeller housing 56 so that threaded portions 108 of fasteners 102 are screwed into threaded openings 74 in pump mounting surface 62 securing support platform 65 against support wall 83 and securing upper impeller housing 56 to pump mounting surface 62 to secure oil pump assembly 50 to fryer 10 with impeller 58 positioned between upper impeller housing 56 and lower impeller housing 60.

Heat dissipating component 53 in FIG. 3*b*, which is located underneath pump motor 52, is a metal fan blade of the air-slinger type attached to pump shaft 54. As shaft 54 rotates, heat dissipating component 53 blows air away from pump motor 52, helping to keep pump motor 52 and its bearings cool. Because heat dissipating component 53 is metal, it also helps keep pump shaft 54 and pump motor 52 cool by conducting heat away from those components.

Referring to FIG. 3*a*, in operation, pump motor 52, for example, is a variable-speed motor as will be described later, that sits well above a predetermined oil level 61. Predetermined oil level 61, for example, is an oil level which is a maximum level in vat 12 that the oil will reach. Predetermined oil level 61 is shown as a dashed line in vat 12 in FIG. 3*a*. The impeller 58 sits submerged in the oil as does the upper impeller housing 56. As pump motor 52 turns, impeller 58 is caused to rotate via pump shaft 54. The rotation of the impeller 58 causes oil to be drawn towards impeller 58 through hole 57 in upper impeller housing 56. Centripetal acceleration caused by rotation of impeller 58 then forces the oil out through an outlet 63 formed in lower impeller housing 60 and into a heat exchanger 82, as shown in FIG. 4.

Figure 4:
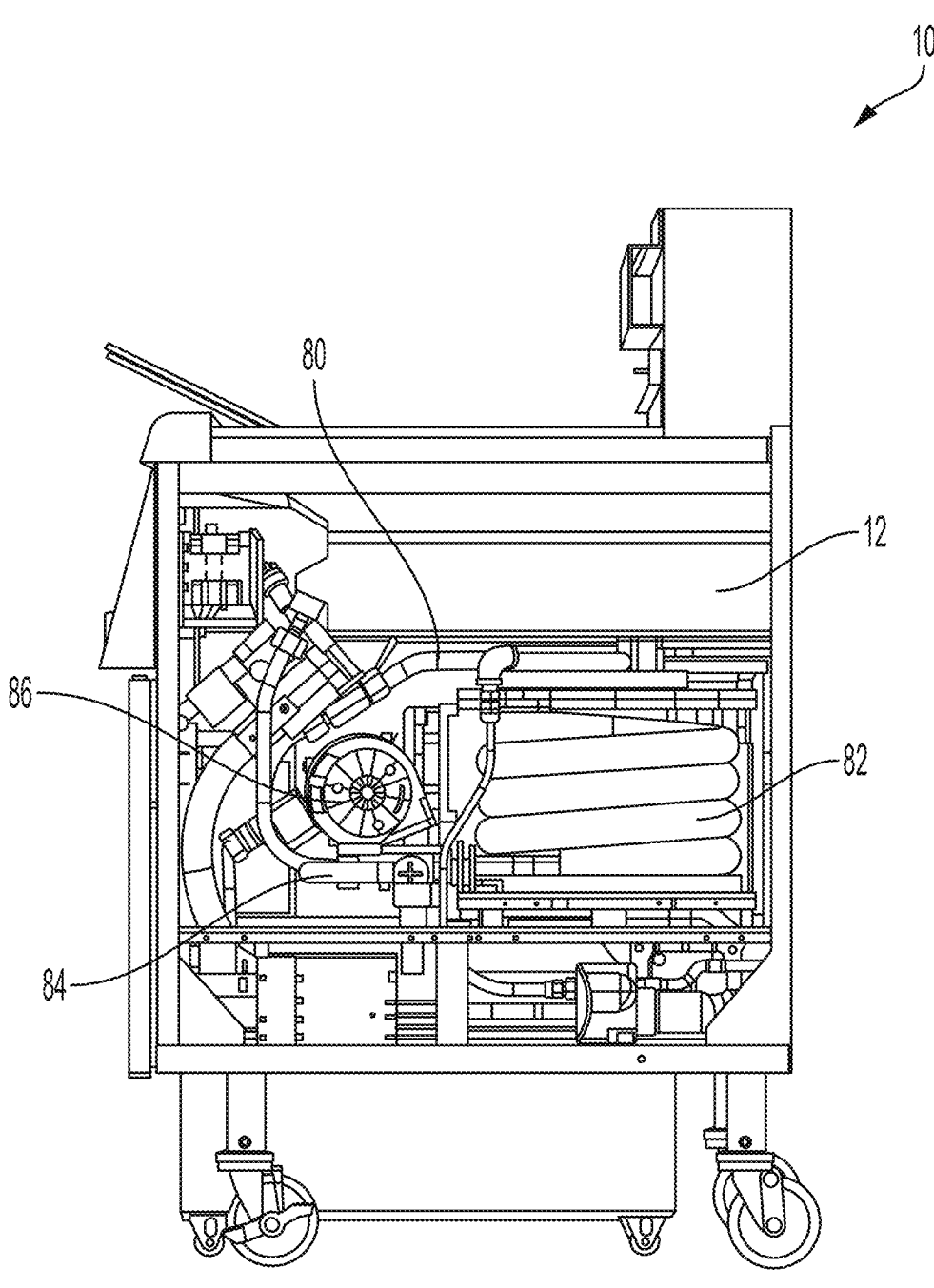
FIG. 4 is a right-side view of the fryer of FIG. 1 with side panels removed and an outer casing of a heat exchanger removed.

FIG. 4 is a right-side view of fryer 10 with parts removed to reveal the internal components. Of note in FIG. 4 is oil line 80 which leads from outlet 63 of oil pump assembly 50 to an inlet of a heat exchanger 82 and an oil line 84 which leads from an outlet of heat exchanger 82 back into a front of oil vat 12. In operation, either during a cooking cycle or while fryer 10 is idling (when oil is being kept hot but circulating at a lower rate) the cooking oil is circulated from oil vat 12 through oil pump assembly 50, through oil line 80 into heat exchanger 82 that heats the oil, then out through line 84 and back into vat 12.

Figure 5:
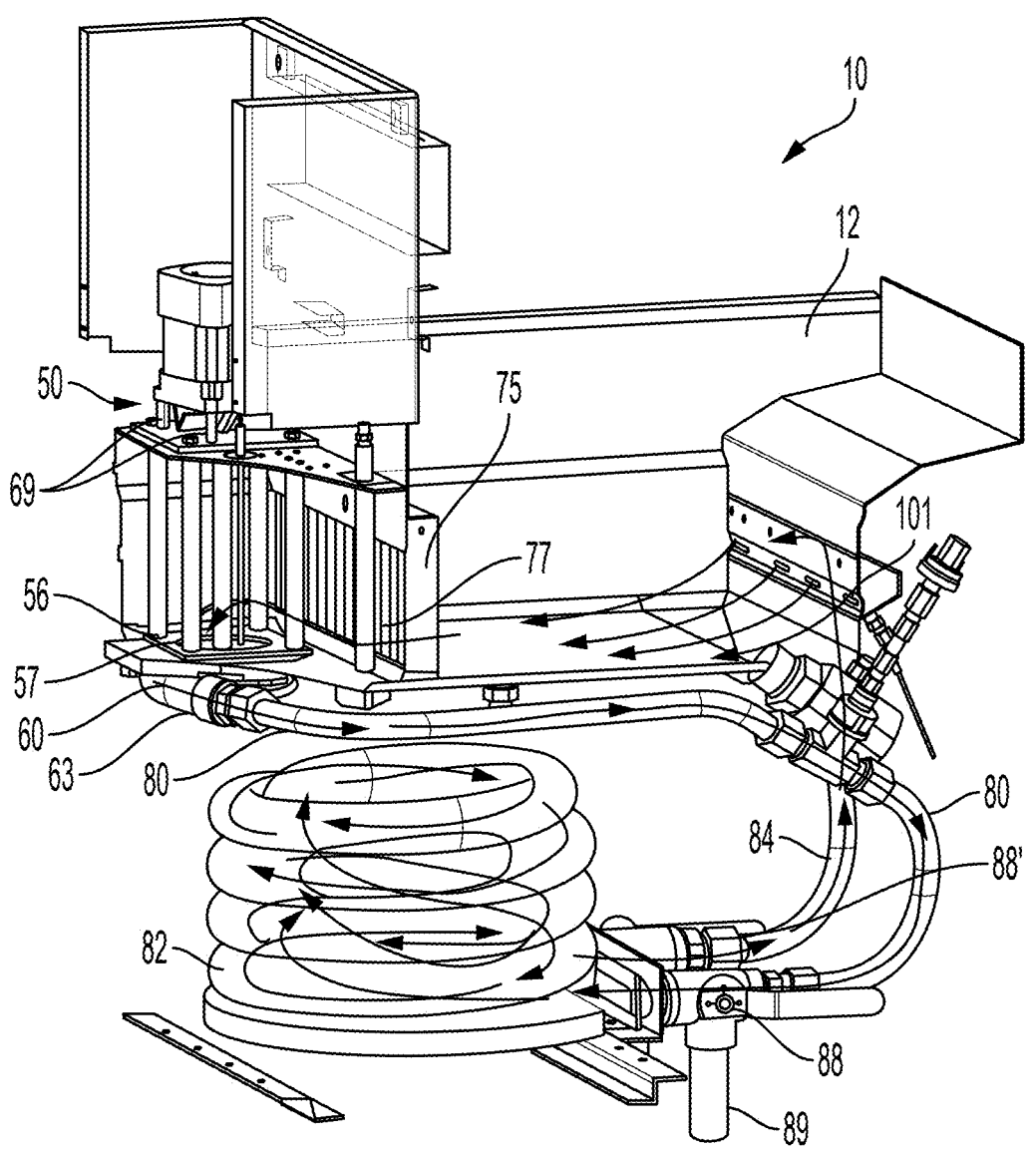
FIG. 5 is a left-rear partial perspective view of the fryer of FIG. 1 having parts removed to show main oil circulation components and flow lines illustrating a flow path of circulating oil.

Referring to FIG. 5, the main oil circulation components are shown having flow lines illustrating a flow path of the oil that is circulated in fryer 10, for example, during cooking or during an idle mode of operation. FIG. 5 shows that the oil flows from vat 12 into an impeller portion of oil pump assembly 50, namely, the oil passes through opening 77 of intermediate wall 75, through hole 57 in upper impeller housing 56, between upper impeller housing 56 and lower impeller housing 60, and into outlet 63 formed in lower impeller housing 60. From there the oil flows through oil line 80 through valve 88 into heat exchanger 82. Heat exchanger 85 is shown having coils of conduit that are heated by combustion gases; however, heat exchanger 85 can be other heat exchangers that heat the oil. After the oil is heated from passing through heat exchanger 82, the oil then flows out through valve 88' and oil line 84 and is returned to the front of oil vat 12 through openings 101 of vat 12 back into vat 12. The flow path of the oil is circulated into and out of vat 12, for example, by activating pump motor 52 to rotate impeller 58 for the duration of a cooking cycle that is controlled by a controller which is typically contained within the user interface 16 and 16' of FIGS. 1 and 2.

The benefits of using a pedestal type pump for oil pump assembly 50 are; i.) no oil seal is needed to protect the motor since pump motor 52 is located above and away from the oil, ii.) the motor bearings of pump motor 52, which are the most temperature sensitive part of the system, are located well away from the hot oil, allowing the motor bearings to stay relatively cool, iii.) there are no shaft bearings located in or near the hot oil, and iv.) the system can be designed so that oil pump assembly 50 (excluding the lower impeller housing 60) can be easily removed from the fryer 10 without need to drain the oil.

Fryer 10 has pump motor 52 that is, for example, a variable speed motor so as to adjust the oil flow rate which in turn affects the rate of heat transfer both to the oil from heat exchanger 82 and from the oil to the food being cooked.

During non-cooking periods, fryer 10 will circulate the oil intermittently or at a slow rate and add heat as needed to maintain the oil at the desired temperature. Because there is no cooking load during this time, the amount of heating needed is low and the flow rate can likewise be kept low. This minimizes energy losses and degradation of oil.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

The invention claimed is:

1. A fryer comprising:
a vat that is fillable with oil up to a predetermined oil level;
a pump having a pump motor and a pump shaft that is rotated by the pump motor, the pump motor being positioned above the predetermined oil level and the pump shaft being connected to an impeller positioned below the predetermined oil level,
wherein the impeller is positioned between an upper impeller housing and a lower impeller housing, wherein the lower impeller housing is connected to a pump mounting surface on a lower face of the pump mounting surface and the upper impeller housing is connected to the pump mounting surface on an upper face of the pump mounting surface, and wherein the pump mounting surface is connected to the vat so that the upper face of the pump mounting surface is inside the vat and the lower face of the pump mounting surface is on an exterior of the vat.

2. The fryer of claim 1, wherein the vat is connected to a heat exchanger so that the oil can circulate out of the vat to the heat exchanger and back into the vat from the heat exchanger.

3. The fryer of claim 2, wherein the lower impeller housing comprises an outlet therein.

4. The fryer of claim 3, further comprising a first oil line that connects the outlet and the heat exchanger.

5. The fryer of claim 4, wherein the vat comprises an inlet therein, and the fryer further comprises a second oil line that connects the heat exchanger and the inlet in the vat so that the oil can circulate from the vat, through a hole in the upper impeller housing, between the upper impeller housing and the lower impeller housing, through the outlet formed by the lower impeller housing, through the first oil line, through the heat exchanger, through the second oil line and through the inlet into the vat.

6. The fryer of claim 1, wherein the pump motor is supported on a support platform, and wherein a plurality of fasteners pass through the support platform to connect to the upper impeller housing and the pump mounting surface so that by disconnecting the plurality of fasteners from the pump mounting surface and the upper impeller housing, then the pump motor, the pump shaft, the impeller, the support platform and the upper impeller housing can be removed from the pump mounting surface and the lower impeller housing.

7. The fryer of claim 6, wherein the vat has an intermediate wall and a support wall extending from the intermediate wall, and wherein a plurality of fasteners pass through the support platform and the support wall to connect to the upper impeller housing and the pump mounting surface so that by disconnecting the plurality of fasteners from the pump mounting surface and the upper impeller housing, then the pump motor, the pump shaft, the impeller, the support surface and the upper impeller housing can be removed through an aperture in the support wall from the pump mounting surface, the lower impeller housing and remainder of the fryer.

8. The fryer of claim 1, wherein the pump motor, the pump shaft and the impeller are removable.

9. The fryer of claim 1, wherein the upper impeller housing is removable from the lower impeller housing so that when the upper impeller housing is removed from the lower impeller housing, the pump motor, the pump shaft and the impeller are also removable from the lower impeller housing.

10. A fryer comprising:
    a vat that is fillable with oil up to a predetermined oil level; and
    a pump having a pump motor and a pump shaft that is rotated by the pump motor, the pump motor being positioned above the predetermined oil level and the pump shaft being connected to an impeller positioned below the predetermined oil level,
    wherein the pump shaft connects to a heat dissipating component.

11. The fryer of claim 10, wherein the pump motor is supported on a support platform, and wherein the heat dissipating component is between the pump motor and the support platform.

* * * * *